United States Patent [19]

Kobayashi et al.

[11] 4,356,228

[45] Oct. 26, 1982

[54] FIBER-REINFORCED MOLDABLE SHEET AND PROCESS FOR PREPARATION THEREOF

[75] Inventors: Hirokazu Kobayashi; Minoru Kitanaka, both of Nagoya, Japan

[73] Assignee: Toray Industries, Inc., Tokyo, Japan

[21] Appl. No.: 264,619

[22] Filed: May 18, 1981

[30] Foreign Application Priority Data

May 23, 1980 [JP] Japan ................... 55/67739

[51] Int. Cl.$^3$ ............................................. B32B 5/16
[52] U.S. Cl. ................................. 428/283; 156/285; 156/295; 428/286; 428/287; 428/288; 428/290; 428/327; 428/367; 428/408; 428/902
[58] Field of Search ............... 428/212, 283, 286, 287, 428/288, 290, 327, 367, 408, 902; 156/285, 295

[56] References Cited

U.S. PATENT DOCUMENTS 4,269,884  5/1981  Della Vecchia et al. .......... 428/283

*Primary Examiner*—Marion McCamish
*Attorney, Agent, or Firm*—Austin R. Miller

[57] ABSTRACT

A carbon fiber-reinforced moldable sheet is provided. The moldable sheet comprises a thermoplastic resin and at least two reinforcing agents differing in the length-/diameter ratio, which are incorporated with the thermoplastic resin. One reinforcing agent (A) contained in the composite sheet is a carbon fiber having a length-/diameter ratio of 200 to 30,000 and the other reinforcing agent (B) is a fibrous and/or powdery reinforcer having a length/diameter ratio of less than 50, and the contents of the reinforcers (A) and (B) in the moldable sheet are 5 to 30% by volume and at least 5% by volume, respectively, the sum of the contents of the reinforcing agents (A) and (B) being in the range of from 20 to 50% by volume. The reinforcing effect of the carbon reinforcing fiber (A) is enhanced by the fibrous and/or powdery reinforcing agent (B) filled among spaces of reinforcing fibers (A). Therefore, molded articles made therefrom are excellent in mechanical properties and appearance and light in weight.

14 Claims, No Drawings

FIBER-REINFORCED MOLDABLE SHEET AND PROCESS FOR PREPARATION THEREOF

FIELD OF THE INVENTION

The present invention relates to a fiber-reinforced moldable sheet, i.e., moldable composite sheet formed of a fiber-reinforced thermoplastic resin, which has good moldability and which can provide a carbon fiber-reinforced thermoplastic resin molded article excellent in mechanical properties and appearance and light in weight when it is subjected to stamping or other molding processes, and also to a process for the preparation of such a moldable composite sheet.

BACKGROUND OF THE INVENTION

Carbon fiber-reinforced thermoplastic molded articles are widely used as parts of various mechanical equipment such as automobile parts and aircraft parts and also as sports equipment components and the like, because they have excellent mechanical properties and heat-resistance, and they are extremely light.

As typical means for obtaining these carbon fiber-reinforced thermosplastic molded articles with good productivity, there is a method known which comprises incorporating chopped stands of carbon fibers into a thermoplastic resin and molding the carbon fiber-incorporated thermoplastic resin into an article of a desired shape by ordinary extrusion molding or injection molding. According to this method, however, since the carbon fibers undergo shearing forces at the molding step they are undesirably cut whereby the length of the fibers contained in the molded article becomes very short. The reinforcing effect is not sufficient and the molded article has poor mechanical properties.

As means for eliminating the cutting of carbon fibers and for retaining the original length of the carbon fibers in the molded articles, there may be considered a method comprising penetrating a thermoplastic resin into carbon fibers under heat and pressure to form a composite sheet and subjecting the composite sheet to compression molding such as stamping. However, this method also has deficiencies. More specifically, when a composite sheet having carbon fibers randomly dispersed in a thermoplastic resin is prepared, carbon fibers may only be incorporated at low critical levels and the mechanical properties of the resulting molded article cannot exceed low levels corresponding to this low critical level of the content of carbon fibers. Ordinarily, in order to manifest a satisfactory reinforcing effect in a fiber-reinforced resin molded article, it is necessary that the volume content of the reinforcing fibers in the molded article be lower than the maximum filling ratio of randomly compacted fibers and that spaces among the fibers should be completely filled with the resin. In the case of carbon fibers having a relatively large length/diameter ratio (the length/diameter ratio is hereinafter referred to as "l/d" for brevity), the above-mentioned maximum filling ratio of randomly compacted fibers is low, and therefore, the upper limit of the volume content of the carbon fibers necessary for attaining a required reinforcing effect in the reinforced resin molded article is low, about 30% by volume. Accordingly, improvements of mechanical properties exceeding levels attainable at this critical volume content cannot be expected in the resulting reinforced molded article. For this reason, the mechanical properties of carbon fiber-reinforced thermoplastic molded articles prepared by ordinary extrusion or injection molding using carbon fibers or stamping molding of composite sheets comprising randomly oriented carbon fibers are limited to considerably low levels, and improvements of these low mechanical properties have been eagerly desired in the art.

When a composite sheet comprising carbon fibers of the continuous filament type having a large l/d value as a reinforcing agent is subjected to stamping molding or the like, since the flowability of the carbon fiber layer is poor, it is difficult to obtain a molded article in which the carbon fibers are uniformly distributed, and therefore, moldability of the sheet or the appearance of the resulting molded article is not satisfactory and also the freedom of design of the molded article is considerably restricted.

SUMMARY OF THE INVENTION

It is therefore a primary object of the present invention to provide a molding material in sheet-form which has good moldability and which can provide a carbon fiber-reinforced thermoplastic molded article having excellent mechanical properties and appearance and which is light in weight in good balance, and a process for the preparation of such a moldable sheet.

Other objects and advantages of the present invention will become apparent from the following description.

In accordance with the present invention, there is provided a fiber-reinforced moldable sheet comprising a thermoplastic resin and at least two reinforcing agents differing in the length/diameter ratio, which are incorporated with said thermoplastic resin, wherein one reinforcing agent (A) contained in said moldable sheet is a carbon fiber having an l/d value of from 200 to 30,000 and the other reinforcing agent (B) is of a fibrous and/or powdery form having an l/d value of not larger than 50, and the contents of the reinforcing agents (A) and (B) in said moldable sheet are 5 to 30% by volume and at least 5% by volume, respectively, the sum of the contents of the reinforcing agents (A) and (B) being in the range of from 20 to 50% by volume.

This fiber-reinforced moldable sheet of the present invention contains the carbon fiber (A) having a large l/d value and the fibrous and/or powdery reinforcing agent (B) having a small l/d value, and thus, not only the reinforcing effect of the fiber (A), heretofore utilized, but also the effect of enhancing the reinforcing effect of the fiber (A) by the reinforcing agent (B) filling the spaces among the fibers (A) can be attained. Accordingly, the total content of the reinforcing agent can be increased and effective reinforcement can be attained. For example, in a moldable composite sheet comprising chopped strands of carbon fibers alone as a reinforcing agent, the tensile modulus reaches a maximum value when the carbon fiber content is about 30% by volume and even if the carbon fiber content exceeds this level, enhancement of the tensile modulus cannot be expected. On the other hand, when a carbon fiber having an l/d value of less than 50 is used as the reinforcing agent (B) in combination with chopped strands of carbon fibers, the tensile modulus is highly improved beyond the above-mentioned critical level with an increase of the content of the reinforcing agent (B).

Accordingly, the mechanical properties of the fiber-reinforced moldable sheet of the present invention are highly enhanced over those of a moldable sheet comprising chopped strands of carbon fibers alone as a reinforcing agent, and the fiber-reinforced moldable sheet of the present invention can provide a carbon fiber-reinforced thermoplastic molded article having excellent moldability and appearance and which is light in weight in good balance.

DETAILED DESCRIPTION OF THE INVENTION

The carbon fiber that is used as the reinforcing agent (A) in the present invention is a cut strand of a carbon fiber having an l/d value of 200 to 30,000, preferably 500 to 10,000. If the l/d value of the carbon fiber (A) is smaller than 200, no satisfactory reinforcing effect can be attained. In contrast, if the l/d value of the carbon fiber (A) is larger than 30,000, moldability of the molding material and appearance of the resulting molded article are degraded with reduction of the freedom of design of the molded article. The type of the carbon fiber to be used as the reinforcing agent (A) is not particularly critical in the present invention. For example, carbon fibers of the polyacrylonitrile type, carbon fibers of the rayon type and carbon fibers of the pitch type can be used in the present invention. In order to improve the adhesion to a thermoplastic resin, these carbon fibers may be surface treated. When a chopped strand mat in which the carbon fibers are isotropically dispersed is used, handling of the reinforcing agent (A) is facilitated and the mechanical properties of the moldable composite sheet are advantageously improved.

The type of fibrous and/or powdery reinforcing agent (B) used is not particularly critical in the present invention, as long as the l/d value is smaller than 50. For example, finely cut products of carbon fibers, glass fibers and aromatic polyamide fibers, and graphite powder, glass flakes and mica flakes may be used as reinforcing agent (B). These reinforcing agents may be used singly or as a mixture of two or more of them. From the viewpoint of reinforcing efficiency, finely cut products of carbon fibers are especially preferred. In the present invention, it is important that the l/d value of the reinforcing agent (B) should be not larger than 50, preferably not larger than 40. If the l/d value of the reinforcing agent (B) is larger than 50, it is difficult to disperse the reinforcing agent (B) among the spaces of the carbon fibers (A) and no substantial improvement of the reinforcing effect can be attained.

In the fiber-reinforced moldable sheet of the present invention, the content of the carbon fiber (A) is 5 to 30% by volume, preferably 20 to 30% by volume, and the content of the reinforcing agent (B) is at least 5% by volume, preferably at least 10% by volume, the sum of the contents of the reinforcing agents (A) and (B) being in the range of from 20 to 50% by volume, preferably from 30 to 50% by volume. If the contents of the reinforcing agents (A) and (B) are lower than the above-mentioned lower limits, the reinforcing effect is not satisfactory. In contrast, if the content of reinforcing agent (A) is higher than 30% by volume or the sum of the contents of the reinforcing agents (A) and (B) exceeds 50% by volume, it becomes difficult to completely fill spaces among the reinforcing agents with a thermoplastic resin and a satisfactory reinforcing effect cannot be attained.

Any thermoplastic can be used as the matrix resin in the present invention. However, preferred are polyamides such as nylon 6, nylon 11, nylon 12, nylon 66, nylon 610 and nylon 612, thermoplastic polyester such as polyethylene terphthalate and polybutylene terphthalate, polycarbonates such as poly(bisphenol A carbonate), polyamideimides, polyphenylene sulfide, polyphenylene oxide, polysulfones, polyolefins, styrene resins and acrylic resins. In order to improve the properties of these thermoplastic resins, additives such as heat stabilizers, weathering agents, ultraviolet stabilizers, antistatic agents, lubricants, parting agents, colorants, e.g., dyes and pigments, crystallization promoting agents, nucleating agents and flame retardant agents, may be incorporated into these thermoplastic resins.

Typical processes for preparing the fiber-reinforced moldable sheet of the present invention will now be described.

PROCESS (1)

Using an extruder or the like, a thermoplastic resin is mixed in a molten state with a reinforcing agent (B), and the mixture is extruded in the form of a sheet. Then, mats are formed by dispersing the carbon fibers (A) isotropically and the so obtained sheets are alternately laminated and heated at a temperature higher than the melting point of the thermoplastic resin, under pressure, to obtain an impregnated product.

PROCESS (2)

A reinforcing agent (B) is scattered on the mats formed by dispersing the carbon fibers (A) isotropically, and the resulting mats and thermosplastic resin sheets are alternately laminated and heated under pressure at a temperature higher than the melting point of the thermoplastic resin to obtain an impregnated product.

PROCESS (3)

A powdery thermoplastic resin is dispersed and mixed with appropriate amounts of the reinforcing agents (A) and (B) in an appropriate liquid medium, for example, water, and these components are collected from the liquid medium in the form of a mat by using a screen. The mat is dried and heated under pressure at a temperature higher than the melting point of the thermoplastic resin to obtain an impregnated product.

Processes applicable to the production of moldable composite sheets of the present invention are not limited to the above-mentioned processes. However, a process which comprises a step of mixing under shearing, for example, mixing in a molten state by an extruder, is not preferred because carbon fibers (A) are cut and the l/d value is decreased. As the method for impregnating the reinforcing agents with the thermoplastic resin, a heat-pressing method, an extrusion coating method and an extrusion lamination method. Among these methods, the heat-pressing method may be used is preferred because operations are simple. From the viewpoint of operating efficiency, a method in which the reinforcing agents and thermoplastic sheets are superposed upon one another, are continuously supplied between a pair of endless metal belts and where the superposed reinforcing agents and sheets are continuously heated, compressed and cooled is especially preferred.

A molded article can directly be obtained by molding a sheet simultaneously with impregnation of the reinforcing agents with the thermoplastic resin by performing heating and pressing in the above-mentioned manner. In the present invention, however, molding of the so-obtained fiber-reinforced moldable composite sheet is usually accomplished by preheating the composite sheet at a temperature not lower than the melting or softening point of the resin but lower than the decomposition temperature thereof and subjecting the preheated sheet to press molding, compression molding, stamping molding or the like.

As means for preheating the composite sheet, methods using heating furnaces such as a hot air furnace, an infrared heating furnace and an induction heating furnace and methods comprising contacting the composite sheet with a hot plate or the like may be adopted. Two or more of these methods may be adopted in combination.

The method of molding the preheated sheet is not particularly critical in the present invention. For example, there can advantageously be adopted a compression molding method using a matched die, a method comprising passing the preheated sheet through a profile die to obtain a continuous product of a desired cross-section, and a method comprising winding the preheated sheet around a metal pipe or the like to obtain a tubular product. Furthermore, only a portion of the sheet may be locally heated and molded, for example, by heating the peripheral portion of the sheet alone and subjecting the heated portion to bending or the like, according to need.

A method in which at the step of molding the preheated sheet, the mold, die, metal pipe or other molding tool is maintained at a temperature lower than the melting point or softening point of the thermoplastic resin is especially advantageous from the viewpoint of the productivity, because the preheated sheet is cooled simultaneously with molding. In order to facilitate release or ejection of the molded article from the mold, a releasing agent may be coated on the mold, die or metal pipe used for molding.

The present invention will now be described in detail with reference to the following Examples that by no means limit the scope of the present invention.

EXAMPLE 1

Nylon 6 pellets ("CM 1010" supplied by Toray Industries, Inc.) are mixed in a molten state with chopped carbon strands ("TORAYCA" T-300 supplied by Toray Industries, Inc.) having a fiber length of 6 mm and a diameter of 7 microns at a mixing volume ratio of 79/21 by an extruder. The mixture was pelletized and subjected to melt press molding to obtain a sheet having a thickness of about 0.2 mm. In this sheet, the carbon fibers (reinforcing agent B) had a length of not longer than 250 microns and the length/diameter ratio (l/d value) was not more than 36.

The so-obtained sheets were alternately laminated with mats comprising isotropically dispersed carbon fibers (reinforcing agent A) having a fiber length of 12 mm ("TORAYCA" T-300 supplied by Toray Industries, Inc.), a diameter of 7 microns and a length/diameter ratio of 1700 and having an areal density of about 150 g/m². The laminate was set on a press heated at 250° C. and pressed under 150 Kg/cm² for 3 minutes to obtain a moldable sheet having a thickness of about 2 mm. In this sheet, the content of the reinforcing fiber (A) was 26% by volume and the content of the reinforcing agent B was 16% by volume. When tensile properties of the sheet were tested according to the method of ASTM D-638, it was found that the sheet had a tensile modulus of 3.6 ton/mm² and a tensile strength of 22 Kg/mm².

For comparison, a moldable sheet in which the content of the reinforcing fiber (A) was equal to the sum of the contents of the reinforcers (A) and (B) in the above-mentioned sheet, that is, 42% by volume, was prepared in the same manner as described above by using the above-mentioned mats of carbon fibers (A) and sheets formed of nylon 6 alone. The resulting sheet had a tensile modulus of 2.2 ton/mm² and a tensile strength of 11 Kg/mm². No satisfactory reinforcing effect could be obtained.

For another comparison, the above-mentioned nylon 6 pellets were mixed in a molten state with carbon fiber chopped strands having a fiber length of 6 mm at a volume ratio of 58/42, pelletized and subjected to melt press molding to obtain a nylon 6 sheet having a thickness of about 2 mm, which was reinforced by the carbon fiber (B) alone. In this sheet, the carbon fibers were cut into lengths smaller than 250 microns. The resulting sheet had a tensile modulus of 2.2 ton/mm² and a tensile strength of 16 Kg/mm². Accordingly, it was confirmed that the reinforcing effect was insufficient.

EXAMPLE 2

A sheet was formed according to the same procedures as described in Example 1 except that polybutylene terephthalate pellets ("PBT Resin" 1400 supplied by Toray Industries, Inc.) were used instead of the nylon 6 pellets. In the obtained sheet, the content of the reinforcing fiber (A) was 26% by volume and the content of the reinforcing fiber (B) was 15% by volume. It was found that the sheet had a tensile modulus of 3.3 ton/mm² and a tensile strength of 20 Kg/mm².

For comparison, a sheet comprising polybutylene terephthalate and the carbon fiber (A) alone, in which the content of the carbon fiber (A) was the same as the sum of the contents of the reinforcing fibers (A) and (B) in the above sheet, that is, 41% by volume, was prepared in the same manner as described above. It was found that the sheet had a tensile modulus of 2.0 ton/mm² and a tensile strength of 10.5 Kg/mm².

EXAMPLE 3

Nylon 6 powder (formed by pulverizing "CM1010" supplied by Toray Industries, Inc.), carbon fibers having a fiber length of 12 mm and having a diameter of 7 microns ("TORAYCA" T-300 supplied by Toray Industries, Inc.) as the reinforcing agent (A) and short carbon fibers as the reinforcing agent (B) formed by cutting the above carbon fibers into a short length by using a home mixer were dispersed and mixed in water at a reinforcing fiber (A)/reinforcing fiber (B) volume ratio as shown in Table 1. The dispersed components were collected on a 300-mesh screen, dried, set on a press heated at 250° C. and compressed under 150 Kg/cm² for 3 minutes to obtain a moldable sheet having a thickness of about 2 mm. In these sheets, the length/diameter ratio of the reinforcing fiber (A) was about 1700, and the length/diameter ratio of the reinforcing fiber (B) was not larger than 40. The contents of the reinforcing fibers (A) and (B) in the sheet, the tensile modulus and tensile strength of the sheet and the occurrence of voids in the sheet were as shown in Table 1.

From the results shown in Table 1, it will readily be understood that sheets Nos. 3 through 5 according to the present invention have excellent mechanical properties and do not contain voids in the interior, whereas the reinforcing effect is not sufficient in sheets Nos. 1 and 2 where the sum of the contents of the reinforcing fibers (A) and (B) is lower than 20% by volume, and the strength is low in sheets Nos. 6 and 7 where the reinforcing fiber content exceeds the permissible upper limit and voids are formed. Furthermore, it will be understood that in sheets Nos. 8 and 9 reinforced by the reinforcing fiber (A) alone, formation of voids and reduction of the strength occur at a reinforcing fiber content of 35% by volume.

TABLE 1

| Sheet No. | Volume Content (%) of Reinforcer A | Volume Content (%) of Reinforcer B | Tensile Modulus (ton/mm$^2$) | Tensile Strength (Kg/mm$^2$) | Occurrence of Voids |
| --- | --- | --- | --- | --- | --- |
| 1 | 5 | 10 | 0.9 | 12 | Not observed |
| 2 | 10 | 5 | 1.1 | 13 | Not observed |
| 3 | 20 | 10 | 2.7 | 19 | Not observed |
| 4 | 30 | 10 | 3.7 | 20 | Not observed |
| 5 | 30 | 20 | 4.2 | 22 | Not observed |
| 6 | 30 | 25 | 3.5 | 14 | Observed |
| 7 | 35 | 10 | 3.1 | 12.5 | Observed |
| 8 | 30 | 0 | 2.4 | 18 | Not observed |
| 9 | 35 | 0 | 2.3 | 12 | Observed |

EXAMPLE 4

A sheet was prepared in the same manner as described in Example 1 except that commercially available graphite powder was used as the reinforcing agent (B) instead of the carbon fiber chopped strand. In the obtained sheet, the content of the reinforcing fiber (A) was 23% by volume and the content of the reinforcing agent (B) was 17% by volume. The sheet had a tensile modulus of 3.0 ton/mm$^2$.

EXAMPLE 5

Mats (reinforcing fiber A) comprising isotropically dispersed carbon fibers having a length of 70 mm, a fiber diameter of 7 microns and a length/diameter ratio of 10,000 and having an areal density of 300 g/m$^2$ ("TORAYCA" T-300 supplied by Toray Industries, Inc.) and sheets having a thickness of 0.2 mm, which were prepared from nylon 6 and carbon fiber chopped strands (reinforcing fiber B) as used in Example 1 (the carbon fiber length in the sheets was not larger than 250 microns) were alternately laminated and melt-incorporated in the same manner as described in Example 1 to obtain a composite sheet having a thickness of about 2 mm. The obtained sheet was subjected to stamping molding to obtain a square tray-like molded article having a size of 240 mm × 240 mm × 20 mm (depth).

More specifically, square sheets of 200 mm × 200 mm were cut out from the above composite sheet, and the sheets were preheated for 3 minutes in a hot air circulating furnace maintained at 270° C. The preheated sheets were inserted between female and male molds which were maintained at 120° C., and the molds were closed at a speed of 4 mm/sec. The molded article was cooled for 15 seconds, the molds were opened and the molded article was taken out. The thickness of the molded article was controlled by a spacer having a thickness of 3 mm. The molding pressure was not higher than 50 Kg/mm$^2$. The so-obtained square tray-like molded article had a very good appearance. The contents of the reinforcing fibers (A) and (B) were 27% by volume and 15% by volume, respectively, and the reinforcing fibers (A) and (B) were uniformly distributed throughout the molded article. When test pieces cut from the bottom face of the molded article were subjected to the tensile test, it was found that the molded article had a tensile modulus of 3.5 ton/mm$^2$ and a tensile strength of 21 Kg/mm$^2$ and the molded article was excellent in mechanical properties.

For comparison, a composite sheet was prepared in the same manner as described above except that mats comprising isotropically dispersed carbon fibers having a fiber length of 350 mm and an l/d value of 50,000 were used as reinforcing fiber (A) instead of the above-mentioned mats comprising carbon fibers having a fiber length of 70 mm, and the composite sheet was subjected to stamping molding in the same manner as described above. When distribution of the carbon reinforcing fibers (A) and (B) in the square tray-like molded article were examined, it was found that the contents of the reinforcing fibers (A) and (B) in the central portion of the bottom face of the molded article were 29% by volume and 15% by volume, respectively, and the contents of the reinforcing fibers (A) and (B) in the peripheral portion of the molded article were 18% by volume and 17% by volume, respectively. When test pieces cut out from the peripheral portion of the bottom face of the molded article were subjected to a tensile test, it was found that the tensile modulus was 2.5 ton/mm$^2$ and the tensile strength was 20 Kg/mm$^2$ and the reinforcing effect was insufficient.

INDUSTRIAL APPLICABILITY OF THE INVENTION

In the fiber-reinforced moldable sheet of the present invention prepared according to the above described simple process, the reinforcing effect is enhanced by a fibrous and/or powdery reinforcing agent having a small l/d value which is filled among spaces of carbon fibers of the reinforcing fiber (A) having a relatively large l/d value. Therefore, the mechanical properties of the molding material can remarkably be enhanced. Furthermore, the fiber-reinforced moldable sheet has good moldability, and the molded articles made therefrom are excellent in the mechanical properties and appearance and are light in weight.

Dish-like compression-molded articles, vessel-like compression-molded articles and other compression-molded articles having a three-dimensional structure, continuous length molded articles of a desired cross-section and tubular molded articles, which are obtained by molding of the fiber-reinforced moldable sheet of the present invention, have the above-mentioned excellent properties and may be effectively used as parts of various machines such as automobile parts, airplane parts and parts of electric and electronic devices and sports equipment components widely in various fields.

We claim:

1. A fiber-reinforced moldable sheet comprising a thermoplastic resin and at least two reinforcing agents differing in the length/diameter ratio, which are incorporated with said thermoplastic resin in a mixed state, wherein one reinforcing agent (A) contained in said composite sheet is a carbon fiber having a length/diameter ratio of 200 to 30,000 and the other reinforcing agent (B) is a fibrous reinforcing agent having a length/diameter ratio of less than 50, and the contents of the reinforcing agents (A) and (B) in said moldable sheet are 5 to 30% by volume and at least 5% by volume, respectively, the sum of the contents of the reinforcing agent (A) and (B) being in the range of from 20 to 50% by volume.

2. A fiber-reinforced moldable sheet as set forth in claim 1, wherein the reinforcing agent (A) is a mat comprising isotropically dispersed carbon fiber chopped strands having a length/diameter ratio of 500 to 10,000.

3. A fiber-reinforced moldable sheet as set forth in claim 1 or 2, wherein the reinforcing agent (B) comprises finely cut carbon fibers having a length/diameter ratio of not larger than 40.

4. A fiber-reinforced moldable sheet as set forth in any one of claims 1 through 3, wherein the contents of the reinforcing agents (A) and (B) in said moldable sheet are 20 to 30% by volume and at least 10% by volume, respectively, and the sum of the contents of the reinforcing agent (A) and (B) are in the range of from 30 to 50% by volume.

5. A fiber-reinforced moldable sheet as set forth in any one of claims 1 through 4, wherein the thermoplastic resin is a polyamide.

6. A fiber-reinforced moldable sheet as set forth in any one of claims 1 through 4, wherein the thermoplastic resin is a polyester.

7. A fiber-reinforced moldable sheet as set forth in any one of claims 1 through 4, wherein the thermoplastic resin is a polycarbonate.

8. A fiber-reinforced moldable sheet as set forth in any one of claims 1 through 4, wherein the thermoplastic resin is a polyamideimide.

9. A fiber-reinforced moldable sheet as set forth in any one of claims 1 through 4, wherein the thermoplastic resin is a polyphenylene sulfide.

10. A fiber-reinforced moldable sheet as set forth in any one of claims 1 through 4, wherein the thermoplastic resin is a polysulfone.

11. A process for the preparation of a fiber-reinforced moldable sheet of a sheet form as set forth in any one of claims 1 through 10, which comprises alternately laminating the reinforcing agent (A) and a sheet formed by mixing the thermoplastic resin with the reinforcing agent (B) in a molten state and heating and pressing the laminate to form an impregnated product.

12. A process for the preparation of a fiber-reinforced moldable sheet as set forth in any one of claims 1 through 10, which comprises alternately laminating a mixture of the reinforcing agents (A) and (B) and a sheet of the thermoplastic resin, heating the laminate at a temperature higher than the melting point of the resin and pressing the laminate to obtain an impregnated product.

13. A process for the preparation of a fiber-reinforced moldable sheet as set forth in any one of claims 1 through 10, which comprises dispersing and mixing a powder of the thermoplastic resin and the reinforcing agents (A) and (B) in a liquid medium, collecting said dispersed components in the form of a mat, drying the mat, heating the mat at a temperature higher than the melting point of the resin and pressing the mat to obtain an impregnated product.

14. A process for the preparation of a fiber-reinforced moldable sheet according to any one of claims 11 through 13, wherein the thermoplastic resin is incorporated with the reinforcing agents at the pressing step by using a heating press.

* * * * *